United States Patent [19]

Esken et al.

[11] Patent Number: 5,760,344
[45] Date of Patent: Jun. 2, 1998

[54] WEIGHING DEVICE FOR BAILERS

[75] Inventors: Juerg Esken, Soest; Martin Hawlas, Harsewinkel, both of Germany

[73] Assignee: CLAAS OHG beschrankt haftende Offene Handelsgesellschaft, Harsewinkel, Germany

[21] Appl. No.: 528,947

[22] Filed: Sep. 15, 1995

[30] Foreign Application Priority Data

Sep. 27, 1994 [DE] Germany .................. 44 36 128.9

[51] Int. Cl.$^6$ .................. G01G 19/08; G01G 19/00; G01G 23/00
[52] U.S. Cl. .................. 177/136; 177/145; 177/161
[58] Field of Search .................. 177/136, 137, 177/138, 139, 145, 151, 154, 161, 162; 56/343, 449, 450

[56] References Cited

U.S. PATENT DOCUMENTS 2,740,250  2/1956  Olson et al. .................. 56/473.5
4,566,380  1/1986  Clostermeyer et al. .................. 100/89
4,742,880  5/1988  Schrag et al. .................. 177/136

*Primary Examiner*—Cassandra C. Spyrou
*Assistant Examiner*—Michael J. Hayes
*Attorney, Agent, or Firm*—Michael J. Striker

[57] ABSTRACT

A weighing device for weighing bails of hay, straw and withering plants produced by a bailer having a pressing and transporting passage has a loading slide, a unit for connecting the loading slide with a bailer so that the loading slide is turnable in a parallelogram-like manner, a unit for fixing bails in a weighing position on the loading slide, a signal producing unit providing a command for determination and registration of a weight of the bail, a controlling and computing device arranged for receiving the command, a measuring value unit for measuring the weight of bails and connected with the controlling and computing device, and an indicating unit connected to the controlling and computing device for indicating the measured weight.

12 Claims, 2 Drawing Sheets

WEIGHING DEVICE FOR BAILERS

BACKGROUND OF THE INVENTION

The present invention relates to a weighing device for bailers, utilized for determination and registration of weight of pressed bails composed of hay, straw and withering plants in the process of its manufacture, preferably for large bailers.

The straw of harvested stalk products is important not only as a fertilizer basis for agricultural and garden purposes or as straw in animal maintenance, but also finds a further industrial utilization for manufacturing other products, such as for example insulation plates, fillers, packing materials, etc. Hay and withering plants are utilized in increased volumes for the supply and for silage for large bails, which provides an effective management in animal maintenance. When the square-shaped large bails are produced by bailers, they also allow to utilize the available transportation capacities and the storage space in agricultural enterprises in a rational cost-saving manner.

For manufacturers, and consumers and final manufacturers not only the daily productivity of the utilized bailers is of interest. In addition, they want to know exactly the total weight of the pressed bails, the weight per piece, and the quantity since, the pressed bails often are supplied directly from the field or model to the corresponding buyer or consumer.

Known bailers for producing square-shaped large bails are provided with loading chute for gradual downward sliding of the pressed large bails to deposit them on the ground area. The sliding chute is forwardly mounted in an axial extension of the pressing and transporting passage at the rear side of the bailer and preferably is subdivided into turnable sections. When needed, the sliding chutes can be folded and unfolded in a simple manner so as to provide easy manuring with the bailer and its effective design.

Also, bail pilers are known for piling the square-shaped pressed large bails and shifting them onto the ground area. The raised and shifted bails are taken by corresponding working devices and with approximately complete utilization of the available transportation space loaded on the transportation vehicle and supplied for a predetermined use. The bail piler is arranged articulately on the bailer and is adjustable in different heights by hydraulic cylinder-piston units for shifting or piling of the square-shaped large bails.

Both the bail piler and the loading slide can be provided with means for the combination of the corresponding weight of the pressed bails. The weight can be detected and registered in the process of expelling the bails from the bailer.

The known solutions are not satisfactory since the weight of the large bails is not determined accurately. Thereby considerable deviations from the actual values are produced which lead to uncertainties and errors in the productivity determination. In view of the high productivity of a large bailer and relatively high weight of a pressed large bail, these deviations can lead to substantial losses at the receiving side.

The deviations during the determination and registration of the weight of the large bails from the actual values are caused first of all in that the weight is determined not in exact fixed weighing position but instead during the passage of the pressed bails inside the path between the end of the pressing passage and the final discharge of the bail to the ground area. Moreover, it must be guaranteed that the weight is measured in the weight force direction, which is not guaranteed with the loading slides articulately connected with the large bailers in the known manner.

SUMMARY OF THE INVENTION

Accordingly, it is an object of the present invention to provide a weighing device for bailers of the above mentioned general type, which avoids the disadvantages of the prior art.

More particularly, it is an object of the present invention to provide a weighing device for bailers in which the weight of the pressed bails can be detected and registered in an exactly defined weighing position.

In keeping with these objects and with others which will become apparent hereinafter, one feature of the present invention resides, briefly stated, in a weighing device in which a loading slide front as a weighing unit is mounted so that it moves out in a parallelogram-like manner on the bailer by means of the longitudinal link, and is provided with means which fix the bail in a weighing position and release by a signal transducer a command for detection and registration of the weight of the bail in a controlling and controlling device which is connected with a measuring value transducer for the weight and with an indicating unit.

The device in accordance with the present invention involves a solution which is relatively simple to produce and has low cost and also can be installed without great expenses on the available large bailers. With the inventive weighing device, the weight of the pressed bails is detected and registered in reproducible manner in an exactly determined position. The bails exiting the pressing and transportation passage of the bailer are stopped in the bail of the bails in its outlet movement by an automatic blocking device on the loading slide and during stoppage of the bail a command is released by a signal transducer to a controlling and computing unit for determination of the weight of the bail which is completely located on the loading slide. The weight of the pressed bail is advantageously determined by a measuring value to a transducer which is connected via a pressure sensor with a controlling and computing unit or a board computer for registration and evaluation of the determined values.

By the subsequent bail coming from the pressing and transportation passage the block which holds the preceding bail in the weighing position is lifted and this bail is placed from the loading slide onto the ground surface, while the subsequent bail enters the loading slide and again is brought for detection and registration of its weight in a weighing position. In this position the pressed bail is located completely on the loading slide. The detection and registration of the weight is performed in an exactly determined and fixed position during the stoppage of the bail which continuously moves out from the press.

The loading slide formed as a weighing device is joined for example via a closed supporting frame which is mounted by a longitudinal link on the housing of the large bailer so that under the action of loading by the weight of the pressed bail which is placed on it, it deviates in a parallelogram-like manner and the weight is measured by the measuring value transducer cooperating with the holding frame always in a direction of the gravity force. In the shown embodiment of the invention it is performed parallel to the force of gravity of the bail located on the loading slide.

In addition to its exact adjustment, the design and the arrangement of the loading slide which acts as a weighing device provides for an accurate and fast detection and registration of for example square bails exiting a large bailer. The deviations in the determined values which eventually occur are reduced in the inventive device to a representative minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
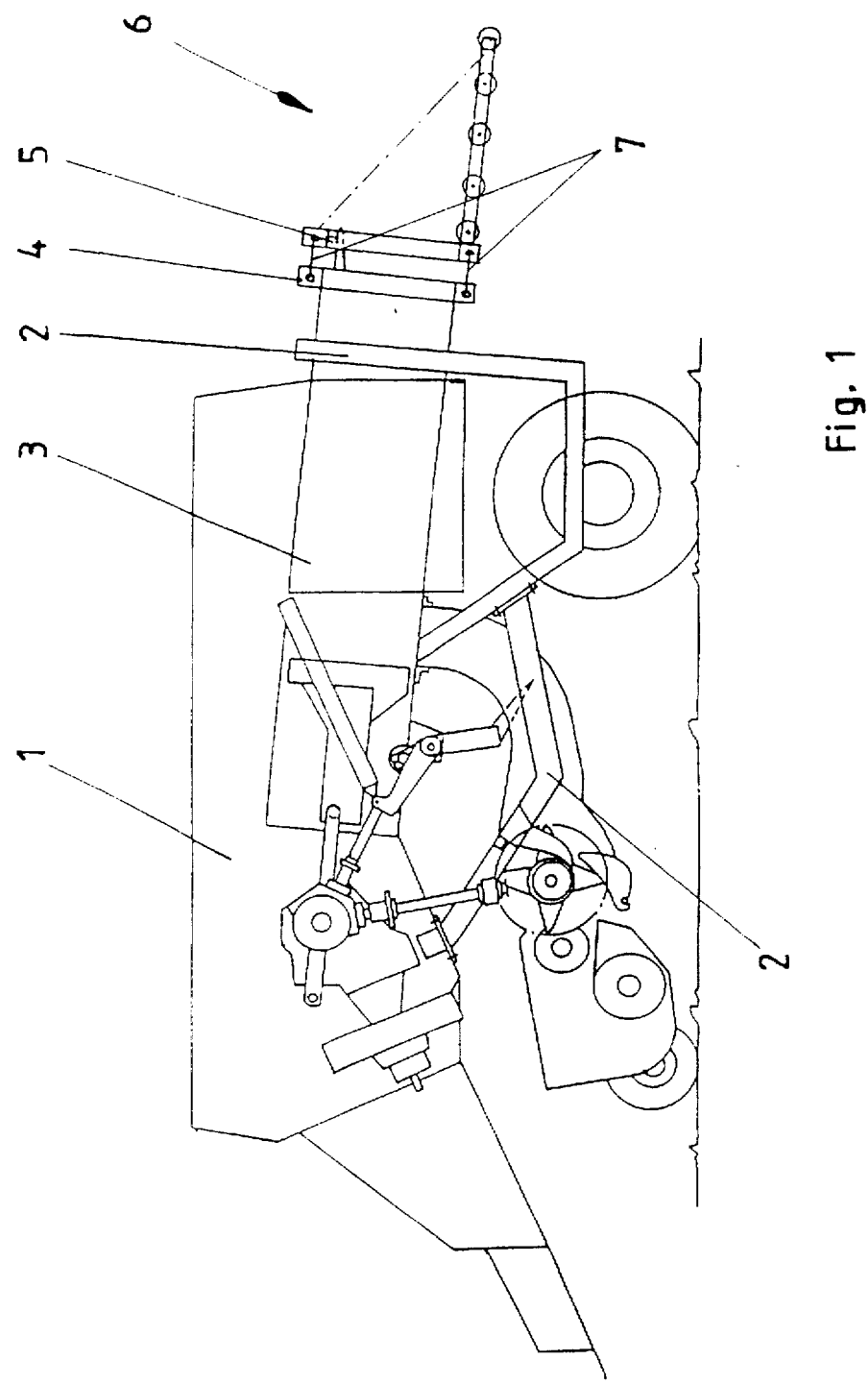
FIG. 1 is a view showing a large bailer with an associated loading slide formed as a weighing device.

FIG. 1 schematically shows a large bailer identified as a whole with reference numeral 1 and arranged on a central machine frame 2. A pressing and transporting passage 3 of the bailer is connected to a part such as a frame 4. A loading slide 6 is mounted by upper and lower longitudinal links 7 on the frame 4 so that it can be turned outwardly from its horizontal plane. The loading slide simultaneously forms a weighing device in accordance with the present invention.

Figure 2:
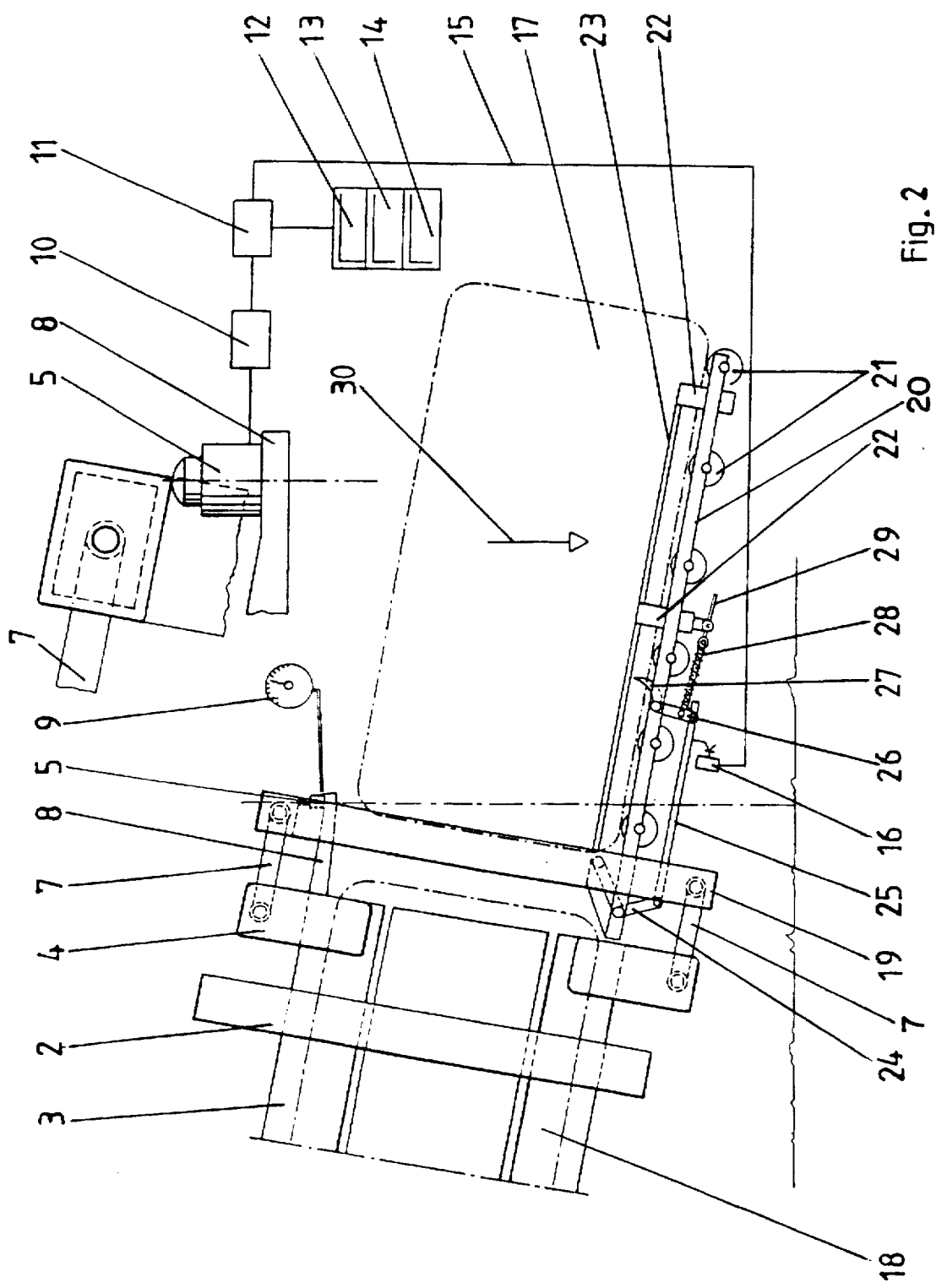
FIG. 2 is a view showing details of the loading slide which forms the weighing device.

As can be seen from FIG. 2, the loading slide 6 which forms the weighing device has a supporting frame 19 with a frame 20 which is fixedly connected with the supporting frame 19 and extends at an angle of 90°. The loading slide 6 is mounted by the upper and lower longitudinal links 7 on the pressing and transporting passage 3 of the large bailer so that under the action of load applied by the weight of a bail 17 located on the loading slide 6, the loading slide 6 moves downwardly in a parallelogram-like manner from an original plane. The parallelogram is formed by the frame 4, two links 7 and the supporting frame 19. This arrangement guarantees that the weight of the bail 17 located in an exactly defined weighing position, preferably over its full surface, on supporting rollers 21 of the loading slide 6 is measured parallel to the direction of the gravity force 30.

The weight can be determined, as in the shown example, by a hydraulic measuring process or alternatively by an electronic measuring process with the use of measuring sensors in form of expansion or pressure measuring strips.

A measuring value transducer 5 cooperates with the supporting frame 19 of the loading slide 6. It is mounted fixedly on the large bailer 1 by a holder 8 and connected through a sensor 10 with a controlling and computing unit 11. The controlling and computing unit 11 is further connected with an indicating unit, which can be composed of an indicator 12 for the total weight, an indicator 13 for the weight of the individual bails, and an indicator 14 for the bail quantity pressed during the daily production. A signal generator 16 is connected with the controlling and computing unit 11 through a signal conductor 15. The controlling and computing unit 11 is connected with a pulling rod 25 of a blocking device and signals the exact positioning of the bail 17 located on the loading slide 6. Thereby in the controlling and computing unit 11 a command for determination and registration of the weight of the bail 17 to be weighed is produced.

The blocking device provides the exact fixation of the weighing position of the bail 17 located on the loading slide 6. It has at least one blocking catch 27 supported turnably on the frame 20. The blocking catch 27 is connected through a turning lever 26 and a pulling rod 25 with an angular lever 24 supported at an inlet side in the frame 20. The blocking catch 27 is permanently held in a blocking position by a pre-tensioned pulling spring 28. Its spring tensioning can be adjusted by a pulling spring adjusting element 29 which is articulately connected with the frame 20. The blocking position is lifted automatically by the angular lever 25 which is mounted at the inlet side on the loading slide 6. When a subsequent bail 18 coming from the pressing and transporting passage 3 runs in, the angular lever 24 is turned and together with the blocking catch 27 is moved back to its initial position, when the moved up bail 18 lies on the supporting rollers 21 of the loading slide 6. In this moment a control command is released by the signal transducer 16 which signals the stoppage at the exact positioning of a bail on the loading slide 6 and a command for determination and registration of the weight of the bail 17.

The determination and registration of the weight of the bail is performed in a reproducible predetermined weighing position and in stationary condition. The bails are stopped for short time during their discharge movement, and after anchoring of a subsequent bail coming from the pressing and transporting passage 3 of the large bailer 1 in the loading slide 6 are released for discharge to the ground surface.

The loading slide 6 is provided preferably with supporting rollers 21. This maintains the adhesive friction between the bails and the loading slide as low as possible and ensures a disturbance-free process.

Further side guides 23 provide securing of the exact weighing position of the bails. The side guides 23 are mounted on the frame 20 by web plates 22 and a sensor is to correspond to the longitudinal surfaces of the square bails.

Preferably, the transducer 5 is additionally provided with a measuring device 9. Therefore a direct control of the operation and the working sequence of the weighing device can be provided.

It will be understood that each of the elements described above, or two or more together, may also find a useful application in other types of constructions differing from the types described above.

While the invention has been illustrated and described as embodied in a weighing device for bailers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A weighing device for weighing bails of hay, straw and withering plants produced by a bailer, the weighing device comprising a part provided or the bailer; a loading slide for receiving bails produced by the bailer and articulately connected with said part of the bailer; means for measuring a weight of the bail received by said loading slide; and means for articulately connecting said loading slide with said part of the bailer, said connecting means including link means which connect said loading slide with the part of said bailer so that said part of said bailer, said link means, and said loading slide form a parallelogram with said part of the bailer being immovable and said loading slide being downwardly movable relative to said immovable part of the bailer under the action of the bail received on said loading slide.

2. A weighing device as defined in claim 1, wherein said loading slide has a supporting frame and a slide fixedly connected with said supporting frame, said link means connecting said immovable part of the bailer with said supporting frame.

3. A weighing device as defined in claim 1, wherein said link means include an upper link and a lower link each connecting said immovable part of the bailer with said loading slide.

4. A weighing device as defined in claim 1, wherein said measuring means include a pressure transducer connected with said loading slide, a controlling and computing device for processing measured values and provided with indicating means, and a signal transducer which provides a command for determination and registration of the weight of the bail to said controlling and computing device.

5. A weighing device as defined in claim 1; and further comprising means for placing the bails in weighing position on said loading slide with a full surface contact and fixing the bails.

6. A weighing device as defined in claim 1, wherein said immovable part of the bailer is mounted on a pressing and transporting passage through which the bails are supplied onto the loading slide of the weighing device.

7. A weighing device as defined in claim 1, wherein said loading slide has a frame provided with supporting rollers and side guides arranged to extend along longitudinal sides of a bail when the bail is located on said loading slide frame.

8. A weighing device as defined in claim 7; and further comprising web plates connecting said side guides with said slide frame.

9. A weighing device as defined in claim 5, wherein said means for fixing include at least one turnable blocking catch connected with said loading slide, a pulling rod, a turning lever connected with said blocking catch by said pulling rod and adjustably mounted on said pulling rod, and an angular lever turnably supported on an inlet side.

10. A weighing device as defined in claim 9; and further comprising a pre-tensioned pulling spring folding said blocking catch in a blocking position which is removed under action of said angular lever.

11. A weighing device as defined in claim 10, wherein said loading slide has a slide frame provided with an adjusting device, said pulling spring having a free end connected with said adjusting device so as to adjust said pulling spring.

12. A weighing device as defined in claim 9; and further comprising a signal transducer connected with a controlling and computing unit, said pulling rod being in operative connection with said signal transducer.

* * * * *